Feb. 24, 1970  L. L. PFAHLER  3,496,642
TELESCOPIC SIGHT COVER ASSEMBLY WITH QUICK-RELEASE
Filed July 11, 1968  2 Sheets-Sheet 1
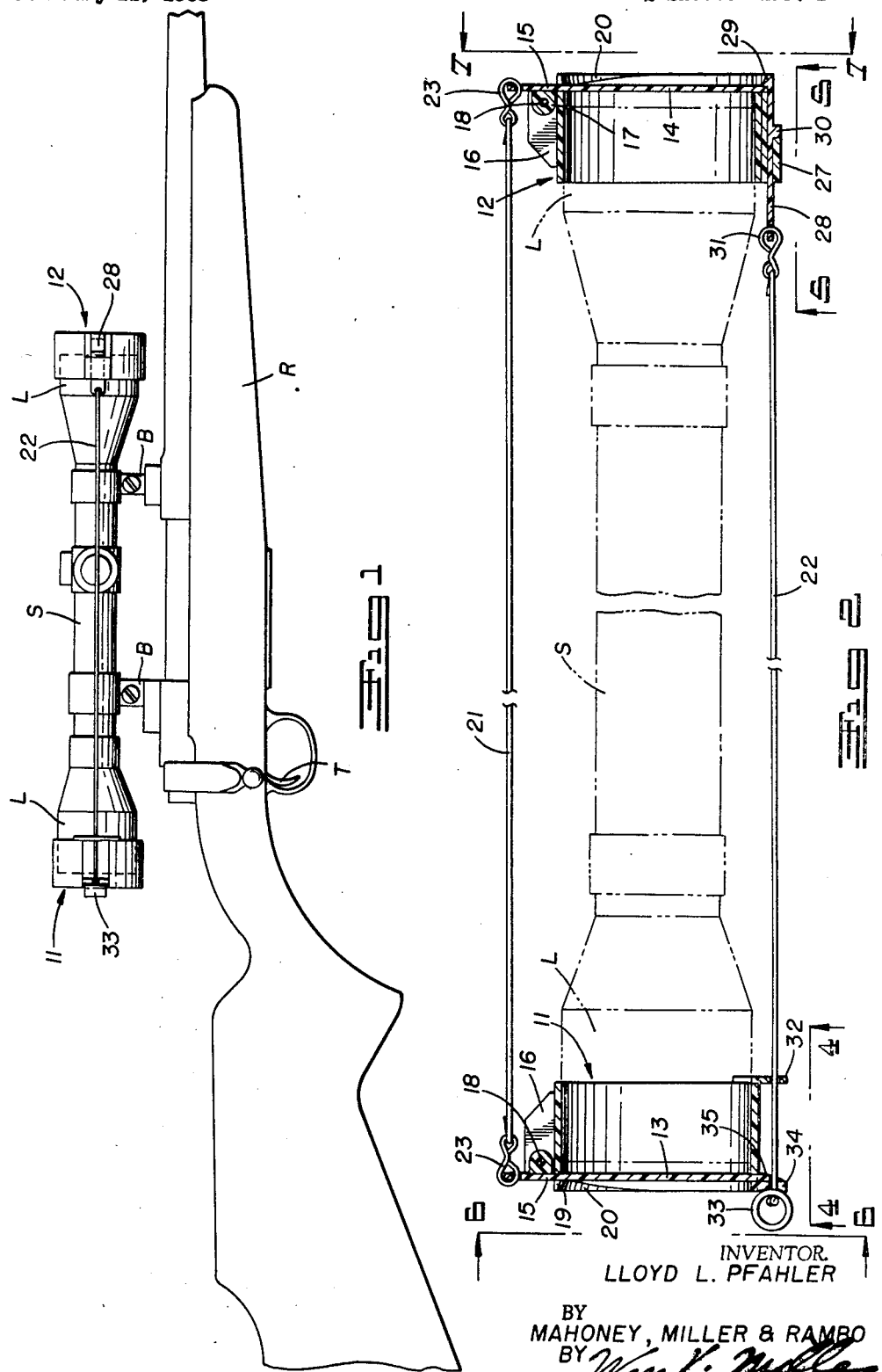
INVENTOR.
LLOYD L. PFAHLER
BY MAHONEY, MILLER & RAMBO
BY Wm. V. Miller
ATTORNEYS

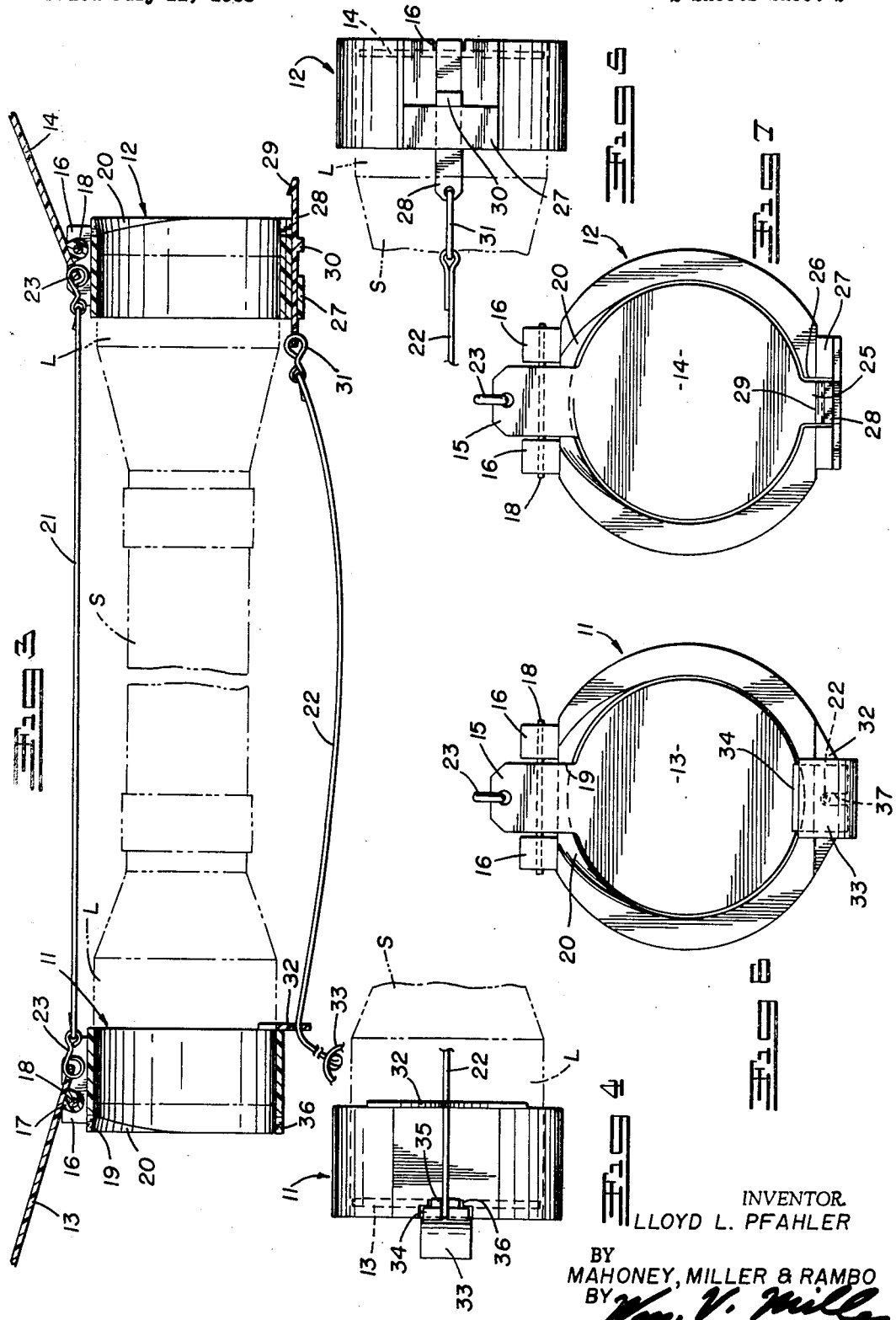

United States Patent Office 3,496,642
Patented Feb. 24, 1970

3,496,642
TELESCOPIC SIGHT COVER ASSEMBLY WITH QUICK-RELEASE
Lloyd L. Pfahler, Columbus, Ohio, assignor of one-half to Nicholas M. Savko, Columbus, Ohio
Filed July 11, 1968, Ser. No. 744,118
Int. Cl. F41g 1/38
U.S. Cl. 33—50
5 Claims

ABSTRACT OF THE DISCLOSURE

Telescopic sight cover assembly with protective cover shields for the exposed surfaces of the lenses at both ends of the sight. The shields are pivoted for swinging movement from closed lens protective positions to open lens exposing positions. Biasing means is provided for normally holding the shields in closed positions and additional biasing means is provided for swinging both shields to open positions simultaneously upon release of the first biasing means which is provided with quick-release means.

---

Various cover assemblies have been provided in the past for telescopic sights of the type commonly employed on rifles. They have included protective shields for the opposed ends of the telescopic sight but have usually included very complicated mechanism for opening both shields, usually embodying push-pull lever or shaft mechanism which was not only complicated and expensive but also difficult to operate quickly to make the sight ready for use. Another commonly used type of shield of relatively simple construction comprises end caps fabricated from resilient materials designed to frictionally engage the ends of the sight and which are simply pulled off when it is desired to utilize the sight; however, this type of shield is not easily manipulated requiring a substantial amount of time for removal and, for this reason, has not been found fully satisfactory.

The present invention provides covers for both ends of the sight, simple and inexpensive means for holding the covers in closed position, simple and inexpensive means for moving the covers to open position, and simple and inexpensive release mechanism which can be quickly actuated with ease by the thumb of the hand that includes the trigger finger.

In the accompanying drawings, the preferred embodiment of my invention is illustrated and in these drawings:

FIGURE 1 is a side elevational view illustrating the cover assembly applied to a telescopic sight mounted on a rifle which is illustrated schematically.

FIGURE 2 is an enlarged axial sectional view taken on a horizontal plane through the cover assembly and illustrating the telescopic sight schematically, the covers at the opposed ends being shown in closed or protective position.

FIGURE 3 is a view similar to FIGURE 2 but showing the covers swung to their open positions.

FIGURE 4 is a fragmentary elevational view taken from the position indicated at line 4—4 of FIGURE 2.

FIGURE 5 is a similar view taken from the position indicated at line 5—5 of FIGURE 2.

FIGURE 6 is an end view taken from the position indicated at line 6—6 of FIGURE 2.

FIGURE 7 is a similar view taken from the position indicated at line 7—7 of FIGURE 2.

With reference to FIGURE 1 of the drawings, I have shown my invention applied to a telescopic sight S which is carried by a pair of upstanding brackets B from a rifle R which includes the trigger T. The sight includes the cylindrical lens-housings L at the opposed ends thereof.

The cover assembly includes a pair of shield units 11 and 12 comprising cylindrical or tubular sleeve-like housings which will slip axially inwardly onto the opposed lens-housings L and will be retained thereon by frictional engagement therewith although they can be selectively removed if desired. The sleeve 11 carries the pivoted cover shield 13 and the sleeve 12 carries the pivoted cover shield 14. Each shield is of disk-like form and is provided with an outward radial extension 15 which projects outwardly through a notch 19 in the associated sleeve-like housing and between a pair of spaced pivot lugs 16 thereon. The inner surface of the extension is provided with a pin-receiving enlargement 17 which is transversely disposed between the lugs 16 and through which a pivot pin 18 passes, the pin also passing through aligning openings in the lugs 16. The disk body of each of the members 13 and 14 fits snugly in closed position within the associated sleeve at its outer edge to cover and protect the associated lens in the housing L, as indicated in FIGURE 2, but can swing outwardly into an out of the way position as indicated in FIGURE 3. Adjacent the pivot structure each sleeve is beveled or curved, as indicated at 20, to prevent interference during the swinging movement of the shield.

For swinging the two shields 13 and 14 into uncovering position, biasing means in the form of an elongated elastic cord or tension spring 21 is provided and carries hooks 23 at its opposed ends which hook into the outer ends of the shield extensions 15. It will be noted that due to the eccentric relationship of the pivot pins 18 and hooks 23, the shields 13 and 14 will be swung to an outwardly angled position as shown in FIGURE 3 for additional clearance. Normally, this spring 21 will tend to swing the shields 13 and 14 into opened positions but is overcome by a similar biasing means in the form of a spring 22 which is connected to the disks at points diametrically opposed to the extensions 15 and which will keep the shields in closed or lens-protecting positions, the connections being made by quick-release means now to be described.

The shield 14 is provided with the radial latch extension 25 diametrically opposite the extension 15 and which swings into a notch 26 in the outer edge of the housing when the shield 14 is closed. Below this housing and secured thereto is a guide 27 in which a latch bar 28 is slidably positioned in alignment with the notch 26. The outer end of this latch bar 28 is provided with a latch portion or shoulder 29 for engaging the latch-extension 25 of the shield 14 and spaced inwardly thereof is provided with a stop portion 30 which cooperates with the guide 27 to limit inward sliding movement of the entire latch bar 28. The spring 22 is connected to the inner end of the bar 28 by a hook 31 which normally pulls it inwardly until stop 30 stops it at which time the latch shoulder 29 is positioned in engagement with the latch extension 25 of the shield 14 to hold it in closed position.

The spring 22 passes to the unit 11 at the other end of the sight S and passes through a guide eye 32 secured to the inner edge of the sleeve-like housing of that unit. The end of the spring 22 is connected to a tubular lock sleeve 33 adapted to engage a cradle or saddle portion 34 on the outer surface of a radial extension 35 provided on the shield 13 diametrically opposite to the extension 15. The extension 35 swings into a notch 36 in the outer edge of the sleeve-like housing and is provided with a radially inwardly extending notch 37 into which the spring 22 can be slipped, the cradle portion 34 being similarly notched. With the lock 33 positioned as in FIGURE 2, both shields 13 and 14 will be held in closed position, it being understood that the spring 22 will be stronger than the spring 21 so as to overcome the biasing effect thereof tending to swing the shields 13 and 14 simultaneously into open positions.

It will be understood that with the protective shield and cover assembly mounted on the support S, it will normally be in the condition shown in FIGURES 1 and 2, with the shields 13 and 14 at the opposed ends swung inwardly into closed protective positions and releasably latched in those positions. The lock member 33 will be properly positioned relative to the trigger T, by initially positioning the units 11 and 12 on the lens housing L with the lock 33 at either the right or left side for a right or left-handed person, so that it can be engaged with the thumb when the trigger finger is adjacent the trigger T. The specific angular position of the units 11 and 12 relative to the lens-housings L will be in accordance with individual preference and may be other than that shown in FIGURE 1. This will permit quick-release of the latch means, so that the covers 13 and 14 will swing outwardly into open positions as shown in FIGURE 3, permitting sighting and firing of the rifle without delay. It is merely necessary to press the lock 33 outwardly with the thumb, to slide the spring 22 out of the notch 37 and disengage the lock member 33 from the extension 35 on the shield 13 allowing the spring 21 to swing it outwardly. At the same time, the spring 21 will exert an outward swinging force on the shield 14 causing the extension 25 thereof to exert an outward force on the latch bar 28 and simultaneously release the shield 14 at the time the shield 13 is released.

It will be apparent that the above-described structure provides a simple, inexpensive yet effective, covering and shielding assembly for a telescopic sight which can be mounted thereon or removed therefrom with ease. When mounted thereon, the assembly may be positioned conveniently for release whether the user is right- or left-handed. The release can be performed very quickly with the same hand used in actuating the trigger and will not cause undue delay in sighting and aiming.

Having thus described this invention, what is claimed is:

1. A telescopic sight cover assembly for use on a sight having lens housings at opposite ends thereof, comprising two units for mounting on the respective housings; each of said units comprising a sleeve for positioning on the associated housing and a shield having a radial extension which is pivoted to the sleeve for swinging movement of the shield into and out of the sleeve at its outer side between a closed position and an open position, biasing means comprising a tension spring connected between said radial extensions of said shields for normally tending to swing the shields outwardly from the sleeves into open positions, latching means comprising movable latch numbers located diametrically opposite said respective radial extensions for engaging each of said shields for normally preventing functioning of said biasing means to swing said shields into open position, means for normally keeping said latch members in engagement with said shields and comprising a biasing tension spring extending between said movable latch members and of greater strength than said first mentioned spring so as to overcome the biasing effect thereof, and means for quickly releasing one of said latch members from its associated shield to permit automatic release of the other latch member from its associated shield to permit said first mentioned spring to function.

2. An assembly according to claim 1 in which one of said latch members comprises a reciprocable latch bar mounted in the associated sleeve and normally engaging the shield and holding it in closed position, one end of the second biasing spring being connected thereto, the other latch member being carried by the end of the spring and releasably engaging the other shield carried by its respective sleeve.

3. An assembly according to claim 2 in which the last-named latch member is normally seated in a cradle on the outer side of an extension of its associated shield, said spring connected thereto being slidable into and out of a radial slot formed in said extension.

4. A telescopic sight cover assembly for use on a sight having lens housings at opposite ends thereof comprising two units for mounting on the respective housings; each of said units comprising a sleeve for positioning on the associated housing, a shield pivoted to the sleeve for swinging movement into and out of the sleeve at its outer side between a closed position and an open position, biasing means connected with said shields for normally tending to swing the shields outwardly from the sleeves into open positions, latching means at each of said shields for normally preventing functioning of said biasing means to swing said shields into open position, and a biasing tension spring extendible between said latching means and releasably engageable therewith for quickly releasing said latching means to permit said biasing means to function.

5. An assembly according to claim 4 in which each of said shields is provided with a radial extension pivoted to the associated sleeve, and said biasing means comprising an elongated tension spring extending between said radial extensions and connected thereto radially outward of the pivot to provide a pivoting force.

References Cited

UNITED STATES PATENTS

| 2,534,061 | 12/1950 | Rogers | 33—50 |
| 2,782,510 | 2/1957 | Kramm | 33—50 |
| 3,426,433 | 2/1969 | Anderson | 33—50 |

SAMUEL S. MATTHEWS, Primary Examiner

U.S. Cl. X.R.

350—65